United States Patent
Noda et al.

(10) Patent No.: US 10,628,220 B2
(45) Date of Patent: Apr. 21, 2020

(54) INFORMATION PROCESSING SYSTEM, INFORMATION PROCESSING METHOD, AND NON-TRANSITORY COMPUTER-READABLE STORAGE MEDIUM FOR STORING PROGRAM

(71) Applicant: FUJITSU LIMITED, Kawasaki-shi, Kanagawa (JP)

(72) Inventors: Masahide Noda, Kawasaki (JP); Takumi Baba, Kawasaki (JP); Kei Taira, Kawasaki (JP); Motoshi Sumioka, Kawasaki (JP); Takashi Ohno, Kobe (JP); Tatsuro Matsumoto, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 198 days.

(21) Appl. No.: 15/962,308

(22) Filed: Apr. 25, 2018

(65) Prior Publication Data

US 2018/0239643 A1     Aug. 23, 2018

Related U.S. Application Data

(63) Continuation of application No. PCT/JP2015/080961, filed on Nov. 2, 2015.

(51) Int. Cl.
    *G06F 9/50*          (2006.01)
    *G06Q 10/06*       (2012.01)

(52) U.S. Cl.
    CPC ............. *G06F 9/5033* (2013.01); *G06F 9/50* (2013.01); *G06Q 10/0631* (2013.01)

(58) Field of Classification Search
    CPC ....... G06F 9/50; G06F 9/5033; G06F 20/0631

(Continued)

(56) References Cited

U.S. PATENT DOCUMENTS 5,220,674 A * 6/1993 Morgan ................. G06F 3/1203
                                                                                358/1.11
6,452,692 B1 * 9/2002 Yacoub ................. G06F 3/1204
                                                                                358/1.13

(Continued)

FOREIGN PATENT DOCUMENTS

EP           2026196 A2 * 2/2009 ............. G06F 3/126
JP         2001-243164       9/2001

(Continued)

OTHER PUBLICATIONS

International Search Report, PCT/ISA/210, dated Feb. 9, 2016, in corresponding International Patent Application No. PCT/JP2015/080961.

(Continued)

*Primary Examiner* — Ryan D. Coyer
(74) *Attorney, Agent, or Firm* — Staas & Halsey LLP

(57) ABSTRACT

A system includes a first apparatus and a plurality of second apparatuses, wherein a first processor of the first apparatus executes a process that includes: obtaining, for each of one or more resources to be used to perform a task, evaluation information about whether the resource is suitable to be used by each of the plurality of second apparatuses; selecting at least one from the plurality of second apparatuses based on the evaluation information; and transmitting a result of the selection to the plurality of second apparatuses, wherein a second processor of each of the plurality of second apparatuses executes a process that includes, when the second apparatus to which the second processor belongs is not selected by the result of the selection received from the first apparatus, outputting information indicating any of the plurality of the second apparatuses which is selected by the result of the selection.

15 Claims, 21 Drawing Sheets

(58) Field of Classification Search
USPC .......................................................... 718/100
See application file for complete search history.

(56) References Cited

U.S. PATENT DOCUMENTS

| | | | |
|---|---|---|---|
| 7,304,753 B1 * | 12/2007 | Richter | G06F 3/1204 |
| | | | 358/1.14 |
| 7,355,745 B2 * | 4/2008 | Hudson | H04N 1/603 |
| | | | 345/589 |
| 2003/0164977 A1 * | 9/2003 | Aagesen | G06F 3/1206 |
| | | | 358/1.15 |
| 2005/0053017 A1 | 3/2005 | Komiya et al. | |
| 2005/0188087 A1 | 8/2005 | Iyoda | |

FOREIGN PATENT DOCUMENTS

| | | |
|---|---|---|
| JP | 2004-54855 | 2/2004 |
| JP | 2004-199300 | 7/2004 |
| JP | 2005-110205 | 4/2005 |
| JP | 2005-275476 | 10/2005 |

OTHER PUBLICATIONS

International Written Opinion, PCT/ISA/237, dated Feb. 9, 2016, in corresponding International Patent Application No. PCT/JP2015/080961.

* cited by examiner

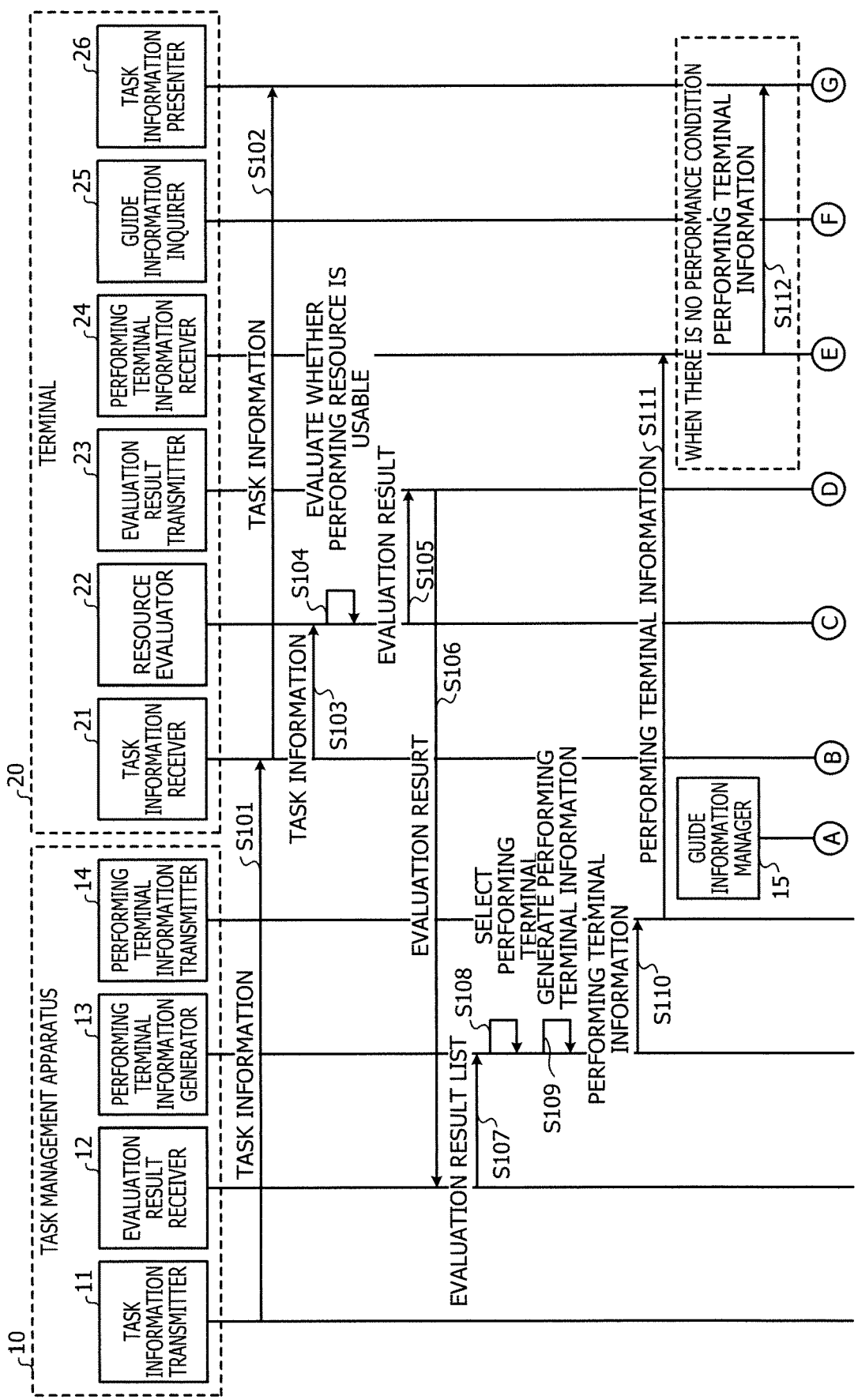

FIG. 5

| ITEM | VALUE |
|---|---|
| TASK ID | 001 |
| TASK NAME | FILL OUT APPLICATION |
| PERFORMING PERSON'S NAME | AAA |
| PERFORMING RESOURCE NAME | APPLICATION (file://sv/path/APPLICATION ROFM.doc) |
| | APPLICATION GUIDE (http//example.com/shinsei_guide) |
| ⋮ | ⋮ |

FIG. 6

| TERMINAL ID | USER NAME | ADDRESS INFORMATION | ... |
|---|---|---|---|
| NOTE PC a | AAA | ... | ... |
| SMARTPHONE a | AAA | ... | ... |
| SMARTWATCH a | AAA | ... | ... |
| : | : | : | : |

| TERMINAL ID | APPLICATION GUIDE | APPLICATION |
|---|---|---|
| NOTE PC a | ○ | ○ |
| SMARTPHONE a | ○ | × |
| SMARTWATCH a | × | × |

FIG. 8

| ITEM | VALUE |
|---|---|
| TASK ID | 001 |
| PERFORMING TERMINAL ID | NOTE PC a |
| PERFORMING CONDITION | NONE |

FIG. 9

| ITEM | VALUE |
|---|---|
| TASK ID | 002 |
| TASK NAME | DOCUMENT CHECK |
| PERFORMING PERSON'S NAME | AAA |
| PERFORMING RESOURCE NAME | DOCUMENT TO BE CHECKED (file://sv/path/DOCUMENT.pptx) |
| | DISPLAY UNIT (1920 × 1200 OR LARGER) |
| ⋮ | ⋮ |

FIG. 10

| TERMINAL ID | DOCUMENT TO BE CHECKED | DISPLAY UNIT |
|---|---|---|
| NOTE PC a | ○ | × |
| SMARTPHONE a | × | × |
| SMARTWATCH a | × | × |

FIG. 11

| ITEM | VALUE |
|---|---|
| TASK ID | 002 |
| PERFORMING TERMINAL ID | NOTE PC a |
| PERFORMING CONDITION | DISPLAY UNIT (1920 × 1200 OR MORE) |

FIG. 12

| RESOURCE NAME | GUIDE INFORMATION |
|---|---|
| DISPLAY UNIT<br>(1920 × 1200 OR MORE) | GO TO<br>○○ CONFERENCE ROOM |
| *.PPTX | INSTALL APP X INTO PC a |
| ○○ CONFERENCE ROOM | GO TO<br>○○ CONFERENCE ROOM |
| SOLDERING IRON | GO TO YY ROOM |
| ⋮ | ⋮ |

FIG. 13

| RESOURCE NAME | GUIDE INFORMATION |
|---|---|
| DISPLAY UNIT (1920 × 1200 OR MORE) | GO TO ○○ CONFERENCE ROOM |
| DISPLAY UNIT (1920 × 1200 OR MORE) | GO TO △△ ROOM |
| *.PPTX | INSTALL APP X INTO PC a |
| ○○ CONFERENCE ROOM | GO TO ○○ CONFERENCE ROOM |
| SOLDERING IRON | GO TO YY ROOM |
| : | : |

FIG. 16

| TERMINAL ID | HTML FILE | .doc FILE | DISPLAY UNIT (1920 × 1200 OR LARGER) | ... | ACTIVATION STATUS |
|---|---|---|---|---|---|
| NOTE PC a | ○ | ○ | × | ... | ○ |
| SMARTPHONE a | ○ | × | × | ... | ○ |
| SMARTWATCH a | × | × | × | ... | × |
| ... | ... | ... | ... | ... | ... |

113

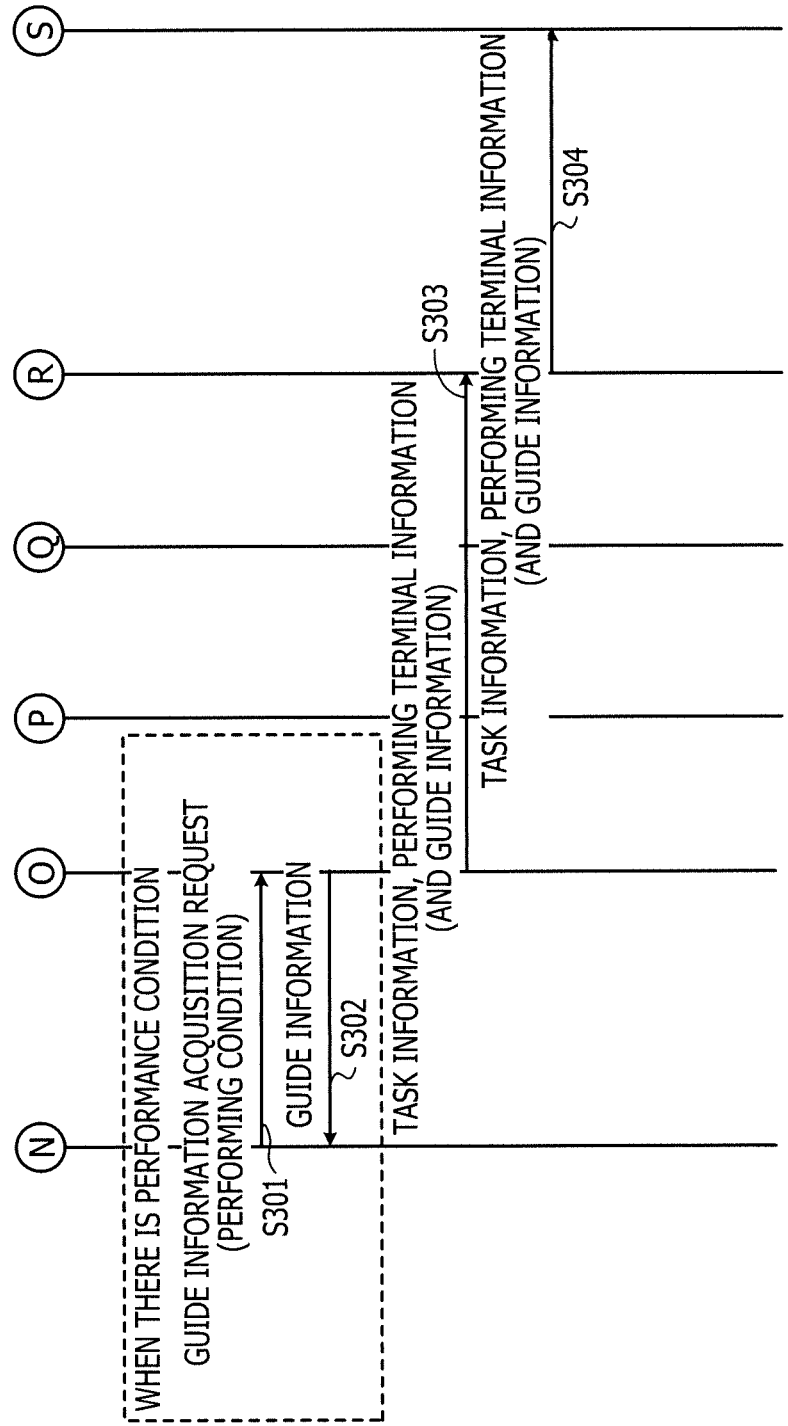

INFORMATION PROCESSING SYSTEM, INFORMATION PROCESSING METHOD, AND NON-TRANSITORY COMPUTER-READABLE STORAGE MEDIUM FOR STORING PROGRAM

CROSS-REFERENCE TO RELATED APPLICATION

This application is a continuation application of International Application No. PCT/JP2015/080961, filed on Nov. 2, 2015, the entire contents of which are incorporated herein by reference.

FIELD

The embodiments discussed herein are related to an information processing system, an information processing method, and a non-transitory computer-readable storage medium for storing a program.

BACKGROUND

Companies and the like have built a computer system for assisting their employees in performing tasks in business. An example of such a computer system is a workflow system in which the temporal order of tasks is defined in advance. Once a preceding task is completed, the system sends to a terminal a message that informs a person, who is expected to be in charge of a subsequent task, about performing the subsequent task.

Examples of the related art include Japanese Laid-open Patent Publication Nos. 2005-110205, 2004-54855, and 2005-275476.

SUMMARY

According to an aspect of the embodiment, an information processing system includes a first information processing apparatus and a plurality of second information processing apparatuses which are connected to the first information processing apparatus via a network, wherein a first processor of the first information processing apparatus executes a process that includes: obtaining, for each of one or more resources to be used to perform a task, evaluation information about whether the resource is suitable to be used by each of the plurality of second information processing apparatuses; selecting one from the plurality of second information processing apparatuses based on the evaluation information; and transmitting a result of the selection to the plurality of second information processing apparatuses, wherein a second processor of each of the plurality of second information processing apparatuses executes a process that includes, when the second information processing apparatus to which the second processor belongs is not selected by the result of the selection received from the first information processing apparatus, outputting information indicating any of the plurality of the second information processing apparatuses which is selected by the result of the selection.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIGS. 4A and 4B are sequence diagrams for explaining an example of a process procedure according to the first embodiment.

FIG. 5 is a diagram illustrating a first example of task information according to the first embodiment.

FIG. 6 is a diagram illustrating a configuration example of terminal information storage.

FIG. 7 is a diagram illustrating a first example of an evaluation result list according to the first embodiment.

FIG. 8 is a diagram illustrating a first example of performing terminal information according to the first embodiment.

FIG. 9 is a diagram illustrating a second example of the task information according to the first embodiment.

FIG. 10 is a diagram illustrating a second example of the evaluation result list according to the first embodiment.

FIG. 11 is a diagram illustrating a second example of the performing terminal information according to the first embodiment.

FIG. 12 is a diagram illustrating a first example of definition information related to guide information.

FIG. 13 is a diagram illustrating a second example of the definition information related to the guide information.

FIG. 16 is a diagram illustrating a configuration example of evaluation result storage.

FIGS. 18A and 18B are sequence diagrams for explaining an example of a process procedure according to the third embodiment.

DESCRIPTION OF EMBODIMENTS

In these years, a single user may often use multiple types of terminals, such as a personal computer (PC), a smartphone, a tablet terminal and a smartwatch.

In this situation, when a message that informs a user about performing a task is sent to one (for example, a PC) of the multiple terminals used by a user, there is high likelihood that the user is not using the terminal that receives the message from a system. As a result, the user may not notice, in a timely fashion, the message that informs the user about performing a task.

One conceivable solution to the situation is to send the message to all the terminals belonging to the user.

All the terminals, however, do not necessarily have capability of performing the same functions. In a case where, for example, a message that informs a user, who is using a smartphone, about performing a task of editing a file is sent to the smartphone which is being used by the user, the user may prefer, rather than the smartphone, other apparatus which is installed a function suitable for editing the file.

In this case, the user may be plagued by a selection of a suitable terminal from vast amounts of terminals, thinking which terminal is suitable to perform the task in accordance with the contents of the task.

According to an aspect of the present description, provided are technologies for being able to guide a person (hereinafter may be referred to as a "performing person") expected to perform a task to a situation suitable for performing the task.

Figure 1:
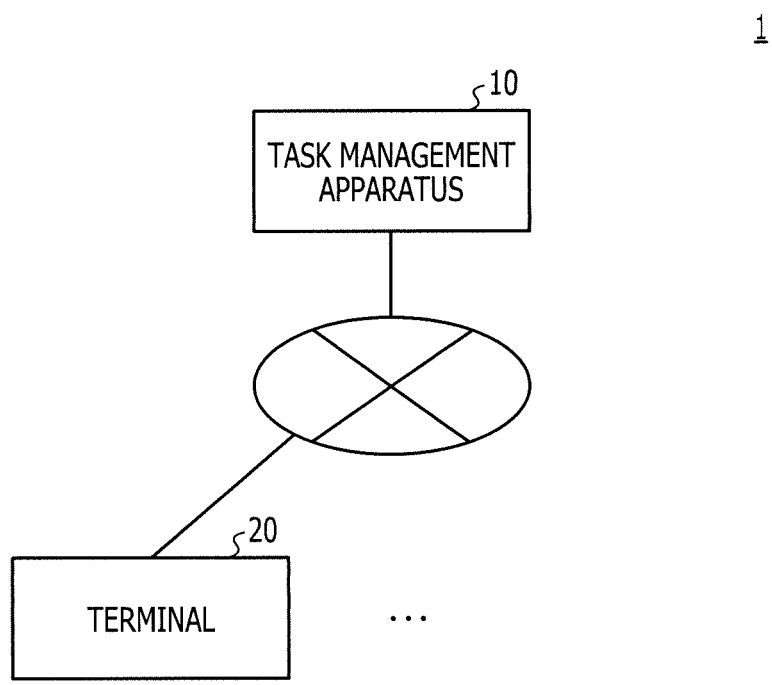
FIG. 1 is a diagram illustrating a configuration example of a task management system according to a first embodiment.

Descriptions will be herein below provided for embodiments of the disclosure, based on the figures. FIG. 1 is a diagram illustrating a configuration example of a task management system 1 according to a first embodiment. In FIG. 1, the task management apparatus 10 (referred to as a first information processing apparatus as well) and multiple terminals 20 (referred to as multiple second information processing apparatuses as well) are connected together through a network. The network may be a wired one or a wireless one. The connection mode may be different from one terminal 20 to another, that is to say, the connection mode of each terminal 20 may be wired or wireless.

The task management apparatus 10 is made from one or more computers to manage tasks to be carried out by the user of the terminals 20. The task management apparatus 10, for example, performs a processes of sending to the terminals 20 a message that informs a user about performing a task, and a process of guiding the user to situations suitable for the user to carry out his/her task. Hereinafter, the message that informs a user about performing a task may be referred to as a "task performing instruction."

In the embodiment, a task may represent a job which a person carries out using any one of his/her terminals 20. One example of the task is a file editing task.

Each terminal 20 is an information processing terminal which may be used by the user in order to perform a task. The terminal 20 is, for example, a personal computer (PC), a smartphone, a tablet terminal, or a smartwatch.

Figure 2:
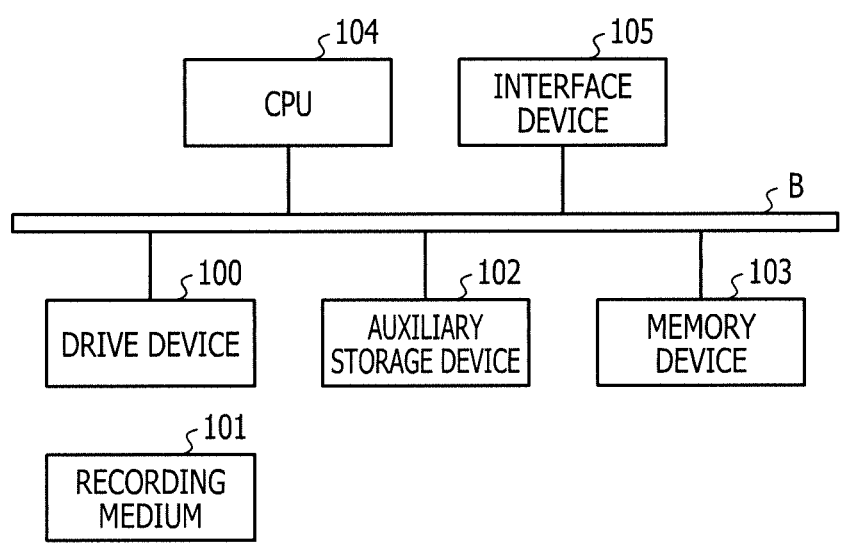
FIG. 2 is a diagram illustrating a hardware configuration example of the task management system according to the first embodiment.

FIG. 2 is a diagram illustrating a hardware configuration example of the task management apparatus according to the first embodiment. The task management apparatus 10 in FIG. 2 includes a drive device 100, an auxiliary storage device 102, a memory device 103, a CPU 104, an interface device 105 and the like which are connected together using a bus B.

Programs for achieving the processes of the task management apparatus 10 is provided by a recording medium 101. Once the recording medium 101 recorded the programs is set into the drive device 100, the programs are installed from the recording medium 101 into the auxiliary storage device 102 via the drive device 100. The programs, however, do not have to be installed from the recording medium 101, and may be downloaded from another computer via the network. The auxiliary storage device 102 stores the installed programs, as well as requested files and data.

Upon receipt of a program activation instruction, the memory device 103 reads the programs from the auxiliary storage device 102, and stores the programs. The CPU 104 executes functions of the task management apparatus 10 in accordance with the programs stored in the memory device 103. The interface device 105 is used as an interface for connection to the network.

Incidentally, the recording medium 101 is, for example, a portable recording medium such as a CD-ROM, a DVD disk or a USB. Meanwhile, the auxiliary storage device 102 is, for example, a hard disk drive (HDD) or a flash memory. The recording medium 101 and the auxiliary storage device 102 each correspond to a computer-readable recording medium.

Note that each terminal 20 may also include the hardware configuration as illustrated in FIG. 2.

Figure 3:
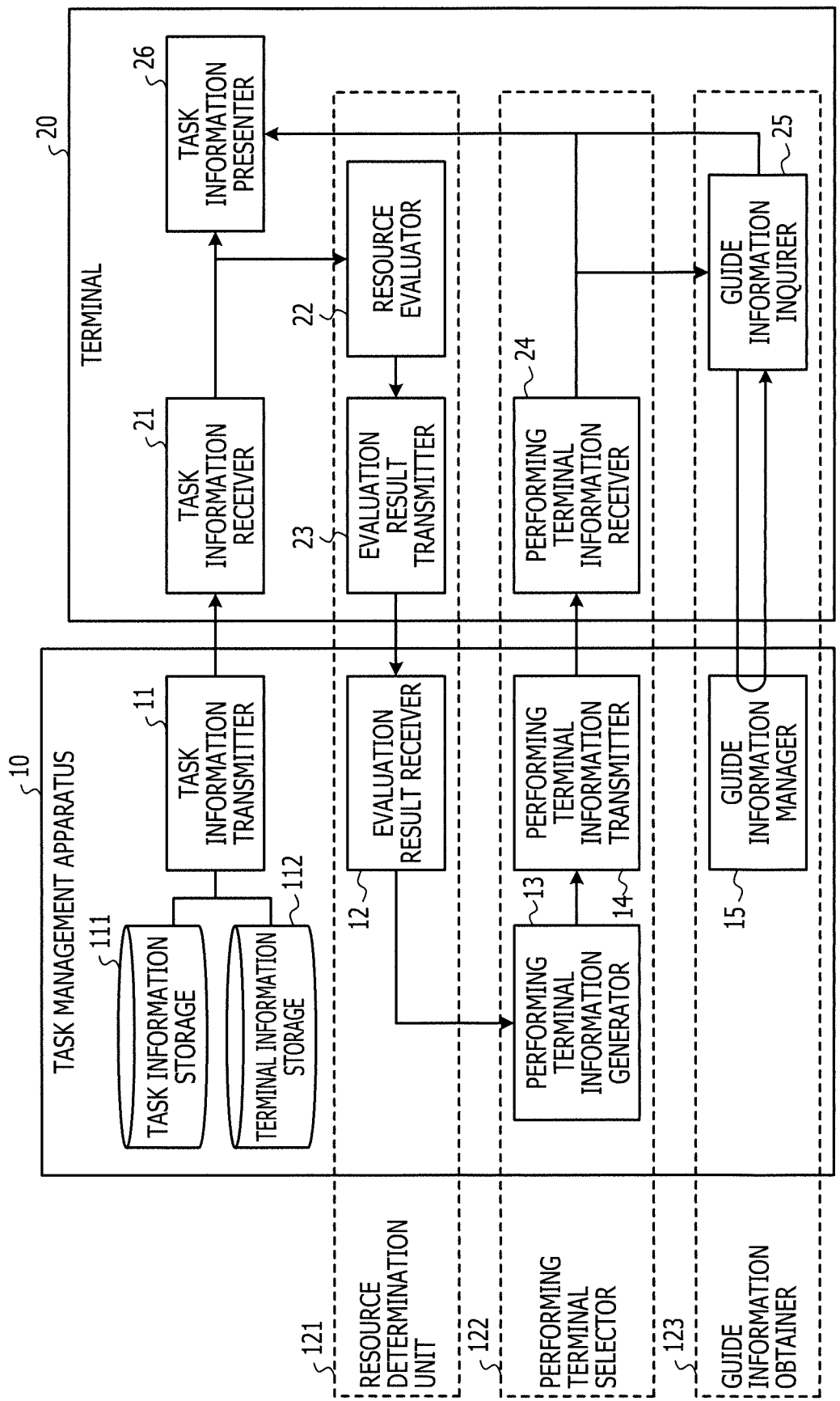
FIG. 3 is a diagram illustrating a functional configuration example of the task management system according to the first embodiment.

FIG. 3 is a diagram illustrating a functional configuration example of the task management system according to the first embodiment. In FIG. 3, the task management apparatus 10 includes a task information transmitter 11, an evaluation result receiver 12, a performing terminal information generator 13, a performing terminal information transmitter 14 and a guide information manager 15. These functions are achieved by processes which one or more programs installed in the task management apparatus 10 causes the CPU 104 to perform. Furthermore, the task management apparatus 10 uses task information storage 111, terminal information storage 112 and the like. These storages may be achieved, for example, by use of storage units or the like which are connectable to the auxiliary storage device 102 or the task management apparatus 10 via the network.

Meanwhile, each terminal 20 includes a task information receiver 21, a resource evaluator 22, an evaluation result transmitter 23, a performing terminal information receiver 24, a guide information inquirer 25, a task information presenter 26 and the like. These functions are achieved by processes which one or more programs installed in the task management apparatus 10 causes the CPU in the terminal 20 to perform.

For each task to be carried out, the task information storage 111 stores a piece of task information which is created in advance. When the performing time of a task comes, the task information transmitter 11 selects a piece of task information related to the task from the pieces of task information stored in the task information storage 111, and sends the piece of task information to terminals 20. The piece of task information includes task identification information, information about one or more resources to be used (or requested) to perform the task, and the like. In this respect, examples of a resource to be used to perform a task (hereinafter referred to as an "performing resource") include file data to be edited for the task, a web page to be browsed, a web page into which to make entries, a parameter for accessing a web service requested to perform the task, and the like. Furthermore, examples of the performing resource may include an apparatus such as an external display to be connected to a terminal 20, a tool such as a laboratory instrument, a material, and a specific person. For example, when a task requests an external display whose performance is equal to greater than a certain level, the external display is treated as a performing resource. For example, when a task is an experiment, or when a task uses a tool, a tool such as a laboratory instrument is treated as a performing resource. For example, when a task is to create an object from a material, the material is treated as a performing resource. For example, when a task is carried out by use of knowledge possessed by a specific person, the person is treated as a performing resource.

The piece of task information further includes identification information (hereinafter referred to as a "user name") about the user who is the person to perform the task. The task information transmitter 11 sends the piece of task information to all the terminals 20 which the user associated with the user name included in the piece of task information uses. Information about association of the user name and his/her terminals 20 is stored in the terminal information storage 112. This embodiment assumes that multiple terminals 20 are associated with each user. For example, each user uses multiple types of terminals 20 such as a PC, a smartphone, a tablet terminal and a smartwatch.

The task information receiver 21 in each terminal 20 receives the piece of task information which is sent from the task information transmitter 11.

The evaluation result receiver 12 in the task management apparatus 10, as well as the evaluation result transmitter 23 and the resource evaluator 22 in each terminal 20 form a resource determination unit 121. In each terminal 20 to which the piece of task information is sent, the resource determination unit 121 determines whether use of each performing resource (or a process) specified by the piece of task information is suitable for the terminal 20. The suitability determination may be a determination on whether it is suitable or not. Alternatively, a level of the suitability may be represented using a numerical value. In other words, the resource evaluator 22 evaluates (determines) whether the terminal 20 may use each performing resource which is specified by the piece of task information received by the task information receiver 21. The evaluation result transmitter 23 sends an evaluation result (hereinafter referred to as a determination result, or evaluation information) of the resource evaluator 22 to the task management apparatus 10. The evaluation result receiver 12 receives the evaluation result sent from each of the terminals 20 to which the piece of task information is sent.

The performing terminal information generator 13 and the performing terminal information transmitter 14 in the task management apparatus 10, as well as the performing terminal information receiver 24 in each terminal 20 form a performing terminal selector 122. Based on the evaluation results from the respective terminals 20, the performing terminal selector 122 selects a terminal 20 (hereinafter referred to as a "performing terminal") to be used to perform the task. In other words, based on the evaluation results, the performing terminal information generator 13 selects a terminal 20 which may use a larger number of performing resources than any other terminals 20, as the performing terminal. The performing terminal information generator 13 generates a performing terminal information which includes information about the performing terminal. In a case where there is a performing resource which is unusable by the performing terminal, information about the performing resource is also included in the performing terminal information. Incidentally, the information about the performing resources unusable by the performing terminal, which is included in the performing terminal information, will be hereinafter referred to as a "performing condition". The performing terminal information generated by the performing terminal information generator 13 is sent by the performing terminal information transmitter 14 to each terminal 20 which is a transmission destination of the piece of task information. The performing terminal information receiver 24 receives the performing terminal information.

The guide information manager 15 in the task management apparatus 10 and the guide information inquirer 25 in the terminal 20 form a guide information obtainer 123. In a case where the performing terminal information includes a performing condition, the guide information obtainer 123 obtains information (hereinafter referred to as "guide information") for guiding the user to a situation where the performing condition is satisfied. In other words, in the case where the performing terminal information received by the performing terminal information receiver 24 includes a performing condition, the guide information inquirer 25 inquires the guide information manager 15 of guide information about the performing condition. The guide information manager 15 obtains or generates the guide information about the performing condition from information stored in advance, from information managed in another system or the like, or from similar things.

The task information presenter 26 in the terminal 20 outputs (presents to the user) information for prompting the user to perform the task which is related to the piece of task information received by the task information receiver 21. In this case, in each of the other terminals 20 which are not selected as the performing terminal, the task information presenter 26 outputs the information about the performing terminal which is indicated by the performing terminal information received by the performing terminal information receiver 24. Furthermore, in a case where the guide information inquirer 25 obtains the guide information, the task information presenter 26 outputs the guide information.

Figure 4B:
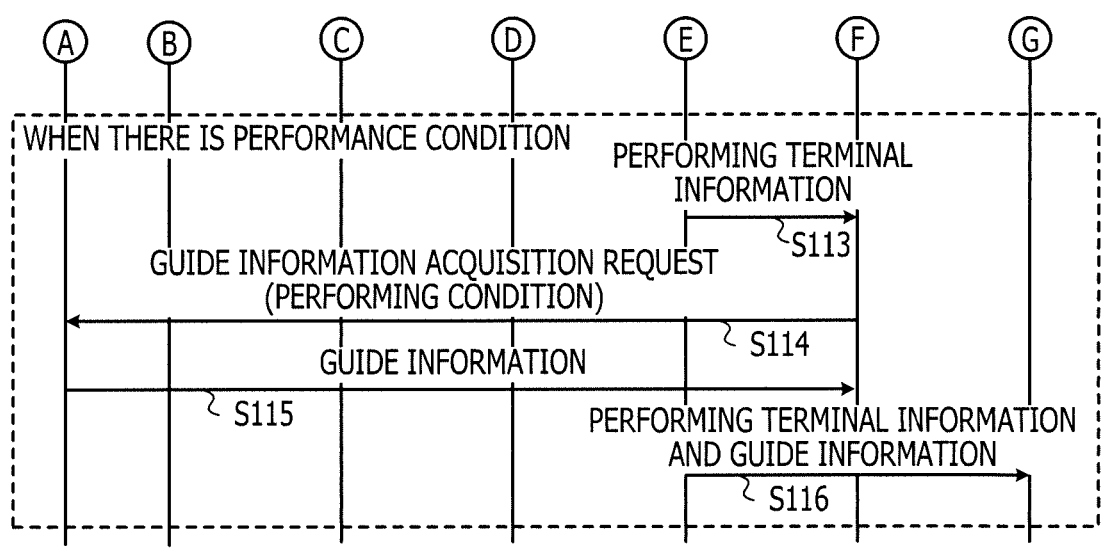

Descriptions will be hereinbelow provided for a procedure for the process which the task management system 1 performs. FIGS. 4A and 4B are sequence diagrams for explaining an example of the procedure for the process according to the first embodiment.

In step S101, the task information transmitter 11 selects a piece of task information (hereinafter referred to as "object task information") related to a task whose performing time comes from all the pieces of task information stored in the task information storage 111, and sends the object task information to all the terminals 20 associated with a performing person.

FIG. 5 is a diagram illustrating a first example of a piece of task information according to the first embodiment. FIG. 5 illustrates an example where items included in the piece of task information are listed in the left column while values corresponding to the items are listed in the right column. As illustrated in FIG. 5, the pieced of task information includes the values respectively corresponding to the items such as a task ID, a task name, a name of a performing person, names of performing resources, and the like.

A task ID is identification information for uniquely identifying a task. The same task ID, therefore, is not used for different tasks. A task name is a character string for telling the user about contents or the like of the task. The same task name may be used for different tasks. A name of a performing person is a user name of the person expected to carry out the task. A performing resource name is identification information about a performing resource. FIG. 5 illustrates each performing resource name in the form of "a title of a performing resource (a Uniform Resource Locator (URL) of the performing resource)". A title of a performing resource, however, does not have to be included in a piece of task information.

All the terminals 20 corresponding to a person expected to perform a task related to a piece of task information may be identified by referring to the terminal information storage 112.

FIG. 6 is a diagram illustrating a configuration example of the terminal information storage. As illustrated in FIG. 6, for each terminal 20, a terminal ID, a user name, address information and the like are stored in the terminal information storage 112. A terminal ID is identification information assigned to a terminal 20. A user name is a user name of a user of a terminal 20. Address information is information about an IP address or the like for identifying a terminal 20 in the network communication.

For example, in step S101, a record in which the user name includes a performing person's name corresponding to object task information is retrieved from the terminal information storage 112, and the object task information is sent to an address specified by the address information included in the record.

Note that each piece of task information stored in the task information storage 111 may be associated in advance with information about when to perform a corresponding task. In this case, for each piece of task information, the task information transmitter 11 may determine whether the performing time comes by referring to the information about when to perform the task.

Alternatively, a sequence in which the tasks are carried out may be defined. For example, each piece of task information may include a task ID(s) of a task(s) which has (have) to be carried out before the corresponding task. In this case, in responses to detection that the preceding task(s) is (are) completed, the task information transmitter 11 may send to the object task information.

Otherwise, the piece of task information may be transmitted in response to an instruction inputted by manipulation of the user such as an administrator.

Upon receipt of the object task information, the task information receiver 21 in each of the terminals 20 which are the transmission destinations of the object task information notifies the object task information to the task information presenter 26 and the resource evaluator 22 in the same terminal 20 (S102, S103). The task information presenter 26 holds the object task information. Meanwhile, for each of the performing resources related to the performing resource names included in the object task information, the resource evaluator 22 evaluates (determines) whether the terminal 20 may use the performing resource (S104).

For example, a resource indicated by a URL (hereinafter referred to as an "internal resource") as illustrated in FIG. 5 is an electronic resource stored, etc. inside a terminal 20, or in a virtual space such as a computer system connected to the terminal 20 via the network. A determination on whether a terminal 20 may use an internal resource is made based on whether an application for operating the resource related to the URL is installed in the terminal 20. A determination on whether the application is installed in the terminal 20 may be made by asking the operating system (OS) of the terminal 20 about the installation.

Meanwhile, a resource existing in the real space (hereinafter referred to as an "external resource") is not expressed using a URL. For example, an external display is expressed as "Display Unit (1920×1200); a tool is expressed using its name; and a person is expressed using his/her name. Like an external display, some external resources are used by being connected to the terminal 20. With this taken into consideration, a determination on whether a terminal 20 may use an external resource is made based on whether the external resource is currently connected to the terminal 20. To put it specifically, the resource evaluator 22 obtains information about a list of external apparatuses currently connected to the terminal 20 (hereinafter referred to as "connected apparatus information") by asking the OS (for example, a device manager or the like) of the terminal 20 for the connected apparatus information. For each performing resource, the resource evaluator 22 determines whether the terminal 20 may use the performing resource by comparing the name of the performing resource with the connected apparatus information. In other words, in a case where performing resources whose character strings coincide with the performing resource names included in the piece of task information are included in the connected apparatus information, the performing resources are determined usable. The other performing resources are determined unusable. In this case, it is desirable that the performing resource name of an external resource to be used by being connected to the terminal 20 be expressed in a form complying with the format in which the external resource is expressed in the connected apparatus information. Incidentally, the performing resource names of external resources not to be connected to any terminal 20 (for examples, a laboratory instrument, a material, a person or the like) are never included in the connected apparatus information. These external resources, therefore, are determined unusable.

Subsequently, the resource evaluator 22 notifies the evaluation result to the evaluation result transmitter 23 (S105). The evaluation result transmitter 23 transmits the evaluation result to the task management apparatus 10 (S106).

The evaluation result receiver 12 in the task management apparatus 10 is waiting for all the terminals 20 which are the transmission destinations of the object task information to send back their evaluation results. Upon receipt of the evaluation results sent back from all the terminals 20, the evaluation result receiver 12 notifies a list of the received evaluation results to the performing terminal information generator 13 (S107).

FIG. 7 is a diagram illustrating a first example of the list of the evaluation results according to the first embodiment. For each terminal ID, FIG. 7 indicates whether a performing resource related to each performing resource name in the piece of the task information in FIG. 5 is usable. "○" (a white circle) represents that a performing resource is usable, while "x" (a cross) represents that a performing resource is unusable.

Note that out of the terminals 20 which are the transmission destinations of the object task information, terminals 20 not activated perform no steps S102 to S106. In other words, the terminals 20 not activated transmit no evaluation result. With this taken into consideration, the evaluation result receiver 12 may be configured to set a time duration for which the evaluation result receiver 12 waits to receive evaluation results, and to notify a list of evaluation results received within the time duration to the performing terminal information generator 13. In this case, with regard to terminals 20 from which the evaluation result receiver 12 receives no evaluation result within the time duration, the evaluation result receiver 12 may notify an evaluation result indicating that all performing resource are unusable to the performing terminal information generator 13.

Thereafter, based on the list of the evaluation results, the performing terminal information generator 13 selects a performing terminal (S108). To put it specifically, the terminal 20 which may use a larger number of performing resources than any other terminals 20 is selected as the performing terminal. In the example illustrated in FIG. 7, a terminal 20 whose terminal ID is "Note PC a" is selected as the performing terminal. Incidentally, in a case where multiple terminals 20 satisfy the criterion for the performing terminal, the performing terminal information generator 13 may select any one terminal 20 by an arbitrary method, or may select all the multiple terminals 20 as performing terminals. In the case where all the multiple terminals 20 are selected as performing terminals, a decision on which one the user actually uses may be left to the discretion of the user.

After that, based on the result of the performing terminal selection, the performing terminal information generator 13 generates performing terminal information (S109).

FIG. 8 is a diagram illustrating a first example of the performing terminal information according to the first embodiment. As illustrated in FIG. 8, the performing terminal information includes a task ID, a performing terminal ID and a performing condition, and the like. The task ID is a task ID of a task corresponding to the performing terminal information. The performing terminal ID is a terminal ID of the terminal 20 which is selected as a performing terminal. The performing condition is a performing condition which is applicable to a case where the performing terminal carries out the task related to the object task information. In FIG. 7, a terminal 20 whose terminal ID is "Note PC a" may use all the performing resources. In an example illustrated in FIG. 8, therefore, the performing condition is "None".

Thereafter, the performing terminal information generator 13 notifies the generated performing terminal information to the performing terminal information transmitter 14 (S110). The performing terminal information transmitter 14 transmits the performing terminal information to all the terminals 20 which are the transmission destinations of the piece of task information related to the task ID included in the performing terminal information (S111).

Upon receipt of the performing terminal information, the performing terminal information receiver 24 in each terminals 20 performs a different process based on whether the received performing terminal information includes a performing condition. In a case where the received performing terminal information includes no performing condition, the performing terminal information receiver 24 notifies the performing terminal information to the task information presenter 26 (S112). From the pieces of task information already notified and held, the task information presenter 26 selects a piece of task information which including the same task ID as the performing terminal information, and outputs (for example, displays) a message for prompting the user to perform a task related to the piece of task information. In this case, the task information presenter 26 may change contents of the message depending on whether the terminal 20 is the performing terminal. A determination on whether the terminal 20 is the performing terminal may be made based on the performing terminal ID included in the performing terminal information.

For example, the task information presenter 26 in a terminal 20 which is the performing terminal related to the object task information outputs a message such as "Fill out Application". On the other hand, the task information presenters 26 in the terminals 20 which are not the performing terminal related to the object task information output a message such as "Fill out Application Using Note PC a". In other words, the task information presenters 26 in the terminal 20 which are not the performing terminal output a message for guiding the user to the performing terminal. Thus, in a case where a piece of task information as illustrated in FIG. 5 and a performing terminal information as illustrated in FIG. 8 are sent to a note PC a, a smartphone a, and a smartwatch a, the note PC a outputs a message such as "Fill out Application" while the smartphone a and the smartwatch a output a message such as "Fill out Application Using Note PC a". In a case where the user is using the note PC a, the user carries out the task related to the object task information by using the performing resource related to the object task information on the note PC a. On the other hand, in a case where the user is using the smartphone a or the smartwatch a, the user may go to a location where the note PC a is place, and carry out the task related to the object task information by using the note PC a. Incidentally, in a case where the note PC a and the smartphone a are the performing terminals in the setting in which multiple performing terminals are allowed to be selected, the note PC a and the smartphone a may output a message such as "Fill out Application" while the smartwatch a may output a message such as "Fill out Application Using Note PC a or Smartphone a".

Next, descriptions will be provided for how the task management system works in a case where: the object task information includes contents illustrated in FIG. 9; and the list of the evaluation results transmitted from the terminals 20 on the performing resources related to the object task information is as illustrated in FIG. 10.

From the evaluation result list illustrated in FIG. 10, it is learned that the note PC a is selected as the performing terminal. FIG. 10, however, says that no display unit with a size of 1920×1200 or larger is connected to the note PC a. In this case, therefore, performing terminal information as illustrated in FIG. 11 is generated.

FIG. 11 is a diagram illustrating a second example of the performing terminal information according to the first embodiment. The performing terminal information illustrated in FIG. 11 includes "Display Unit (1920×1200 or larger)" which is the resource name of a performing resource determined as unusable by the performing terminal, as a performing condition. To put it specifically, the performing terminal information says that no display unit with a size of 1920×1200 or larger is currently connected to the terminal 20 identified by the performing terminal ID so that the task related to the task ID is unable to be carried out using the terminal 20 for now.

Upon receipt in step S111 of the performing terminal information including the performing condition as illustrated in FIG. 11, the performing terminal information receiver 24 in each terminal 20 notifies the performing terminal information to the guide information inquirer 25 (S113). The guide information inquirer 25 sends the guide information manager 15 a request for acquiring guide information related to the performing condition which is included in the performing terminal information (S114). This acquisition request includes the performing condition. Upon receipt of the acquisition request, the guide information manager 15 obtains the guide information related to the performing condition included in the acquisition request, and sends back the obtained guide information to the guide information inquirer 25 (S115).

For example, the guide information may be created in advance, and obtained from definition information stored in the auxiliary storage device 102 or the like. FIG. 12 is a diagram illustrating a first example of the definition information relating to the guide information. The definition information illustrated in FIG. 12 includes guide information in association with each resource name. In this case, guide information associated with a resource name matching a performing condition is obtained. For example, in a case where a performing condition is "Display Unit (1920×1200 or larger)," a character string representing "Go to ○○○ Conference Room" is obtained as guide information. Otherwise, in a case where a performing condition is "*.pptx," a character string representing "Install App X into PC a" is obtained as guide information. In this respect, "*" is a wildcard. Furthermore, "App X" in "Install App X into PC a" is actually a name of a specific application, or a URL of a web page from which the specific application is downloaded.

Furthermore, the character string representing "App X" may be dynamically generated. For example, in a case where each terminal 20 of each user separately stores history of what application was used for what task in the past, the name of an application used the most frequently in the use history in connection with a resource (for example, "*.pptx") which is the same as the performing condition may be embedded into "App X".

Moreover, in a case where as illustrated in FIG. 13, the definition information includes multiple pieces of guide information which match a single performing condition ("Display Unit (1920×1200 or larger)"), a piece of guide information related to a resource nearest to the performing person may be selected. In this case, the position of the performing person may be identified using the global positioning system (GPS) or the like, or using a position management system, or using a different method. In this respect, the position management system is, for example, a computer system which manages the position of each employee by monitoring whether the employee enters or leaves the office and the like. In addition, each piece of guide information may be associated with position information about a resource related to the piece of guide information. In this case, from multiple pieces of guide information which match the performing condition, a piece of guide information associated with position information indicating about the position of the resource nearest to the identified position of the performing person may be selected. Thus, in a case where one display unit is installed in ○○ conference room near the performing person's desk in the office while another display unit is installed in △△ room near the performing person's desk in a place which the performing person is visiting on a business trip, the performing person may be prompted to go to △△ room if the performing person is in the place of the business trip.

Furthermore, in the case where the definition information includes multiple pieces of guide information which match a single performing condition, a piece of guide information may be selected based on whether the resources related to the respective pieces of guide information are currently used. For example, in a case where "Display Unit (1920× 1200 or larger)" is a performing condition in the example illustrated in FIG. 13, a piece of guide information corresponding to the display unit installed in a room which is not currently used, either the ○○ conference room or the △△ room may be selected. Information about whether the ○○ conference room is currently used, and information about whether the △△ room is currently used may be obtained, for example, from a schedule management system, an asset management system or the like.

Besides, in a case where like "Go to □□□," information for prompting the performing person to go to a certain place is a piece of guide information, the piece of guide information may include a map telling where the place is located. The map may be associated with the piece of guide information in advance, or may be dynamically obtained based on location information about the place to which the performing person is going.

What is more, in a case where a person's name (that is to say, in a case where the resource related to the performing condition is a person) is a performing condition, information about where a person with the name is may be dynamically obtained as a piece of guide information by use of the position management system. Otherwise, in a case where no information about where the person is able to be obtained, information which suggests a place where the person is the most likely to currently be among the places where the person carried out the other tasks related to the other pieces of task information in the past may be dynamically generated as a piece of guide information, based on history of the tasks carried out using the person as the performing resource. For example, a message saying "Mr. (Mis.) A may be in ○○" may be generated as a piece of guide information. To this end, the task performing history may be designed to store where each task was carried out.

In each terminal 20, upon receipt of the guide information which is transmitted in step S115, the guide information inquirer 25 notifies the guide information and the performing terminal information notified in step S113 to the task information presenter 26 (S116). From the pieces of task information already notified and held, the task information presenter 26 selects a piece of task information which includes the same task ID as the performing terminal information, and outputs a message for prompting the user to perform a task related to the piece of task information. In this occasion, the task information presenter 26 further outputs information for prompting the user to take an action corresponding to the piece of task information. Meanwhile, the task information presenters 26 in the terminals 20 other than the performing terminal further output information for prompting the user to use the performing terminal. For example, the performing terminal outputs a message such as "Go to ○○ Conference Room, and Check Document". Meanwhile, the terminals 20 other than the performing terminal output a message such as "Go to ○○ Conference Room, and Check Document Using Note PC a". In this case, the user may go to the ○○ conference room with the note PC a, and perform the task by connecting the note PC a to the display unit in the ○○ conference room.

Note that in a case where no guide information may be obtained although the performing terminal information includes a performing condition, the task information presenter 26 may output the performing condition straightly. This is because in this case, a resource related to the performing condition is likely to be usable based on knowledge or the like of the performing person. In this case, history of manipulations made to the performing terminal after the performing condition is outputted may be recorded, and used to dynamically obtain information later. For example, in a case where it is detected that an application is installed into the performing terminal, guide information about the installation of the application may be stored in association with the resource name of the resource related to the performing condition. Alternatively, the performing person may manually input the guide information corresponding to the performing condition.

As discussed above, according to the first embodiment, the task information is sent to all the terminals 20 used by the person expected to perform the task. This makes it possible for the performing person to notice the task performing instruction no matter which terminal 20 the performing person is currently using.

Furthermore, the performing terminal is selected based on the evaluation results from all the terminals 20 on whether each performing resource is usable, and the information about the performing terminal is sent to all the terminals 20. The terminals 20 other than the performing terminal output the information about the performing terminal. The performing person, therefore, may be guided to the situation suitable to perform the task.

Moreover, in the case where there is a performing terminal which is unusable by the performing terminal, the guide information for making the performing resource usable is also outputted. The performing person is, therefore, relieved from a load which he/she would otherwise bear in order to examine work requested to make a condition in which he/she may perform the task.

Next, descriptions will be provided for a second embodiment. The second embodiment will describe what makes the second embodiment different from the first embodiment. What will not be particularly described with regard to the second embodiment may be the same as those in the first embodiment.

Figure 14:
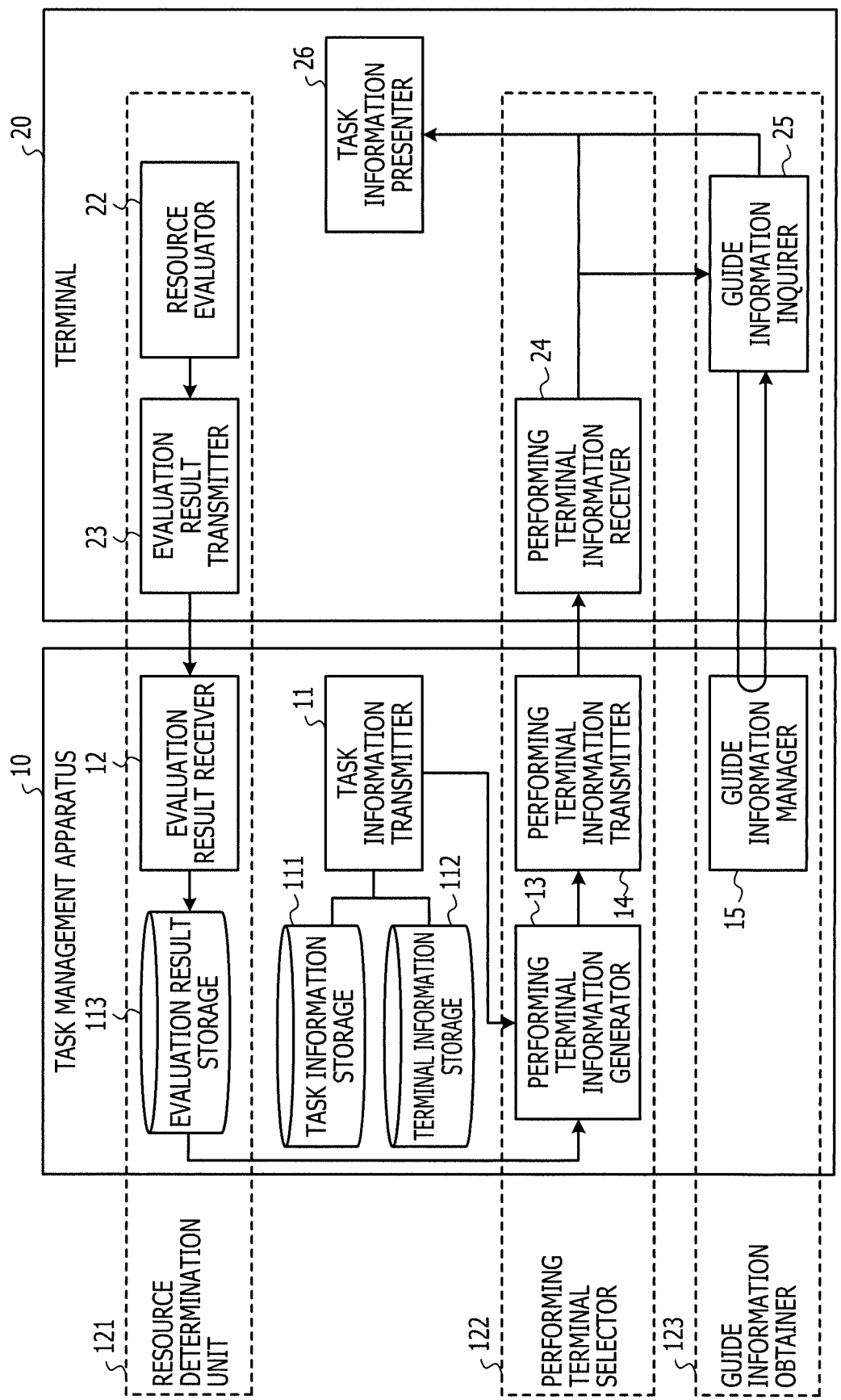
FIG. 14 is a diagram illustrating a functional configuration example of a task management system according to a second embodiment.

FIG. 14 is a diagram illustrating a functional configuration example of a task management system according to a second embodiment. Components in FIG. 14 which are the same as, or correspond to, those in FIG. 3 will be denoted by the same reference signs, and descriptions for such components will be omitted whenever deemed appropriate.

In FIG. 14, the task management apparatus 10 further uses evaluation result storage 113. For each terminal 20, the evaluation result storage 113 stores a result of the terminal's evaluating in advance whether each resource is usable by the terminal 20. In this respect, "in advance" represents "before the transmission of the task information". In other words, in the second embodiment, before the transmission of the task information to all the terminals 20, each terminal 20 evaluates whether each resource which is likely to be used for the task is usable by the terminal 20. When transmitting the task information to all the terminals 20, the task management apparatus 10 simultaneously transmits to them performing terminal information about a performing terminal which is selected based on the evaluation result list stored in the evaluation result storage 113.

Note that in the second embodiment, each terminal 20 does not have to include the task information receiver 21. This is because the task information, together with the performing terminal information, is transmitted from the task management apparatus 10, and is received by the performing terminal information receiver 24.

Figure 15A:
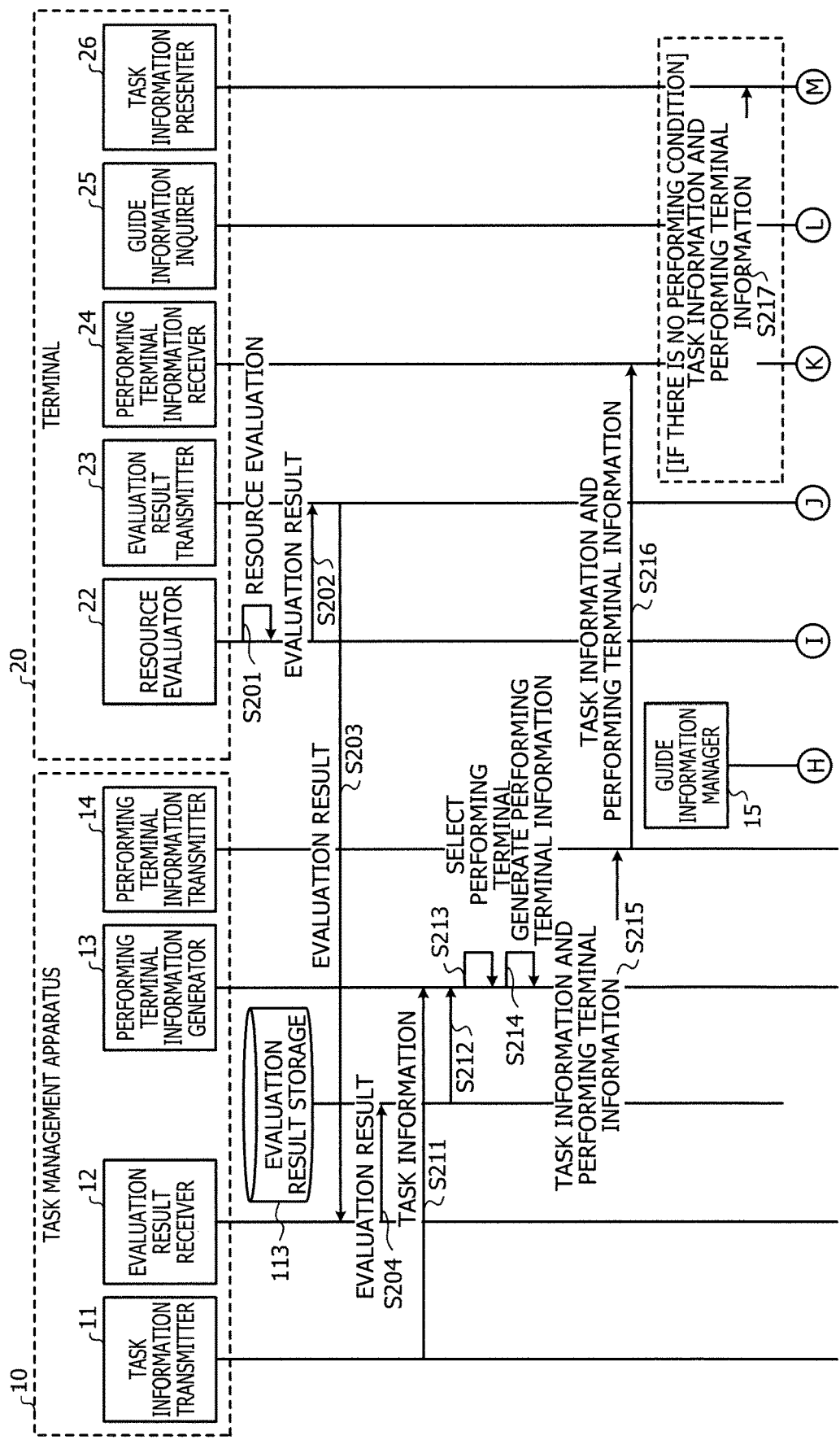
FIGS. 15A and 15B are sequence diagrams for explaining an example of a process procedure according to the second embodiment.
Figure 15B:
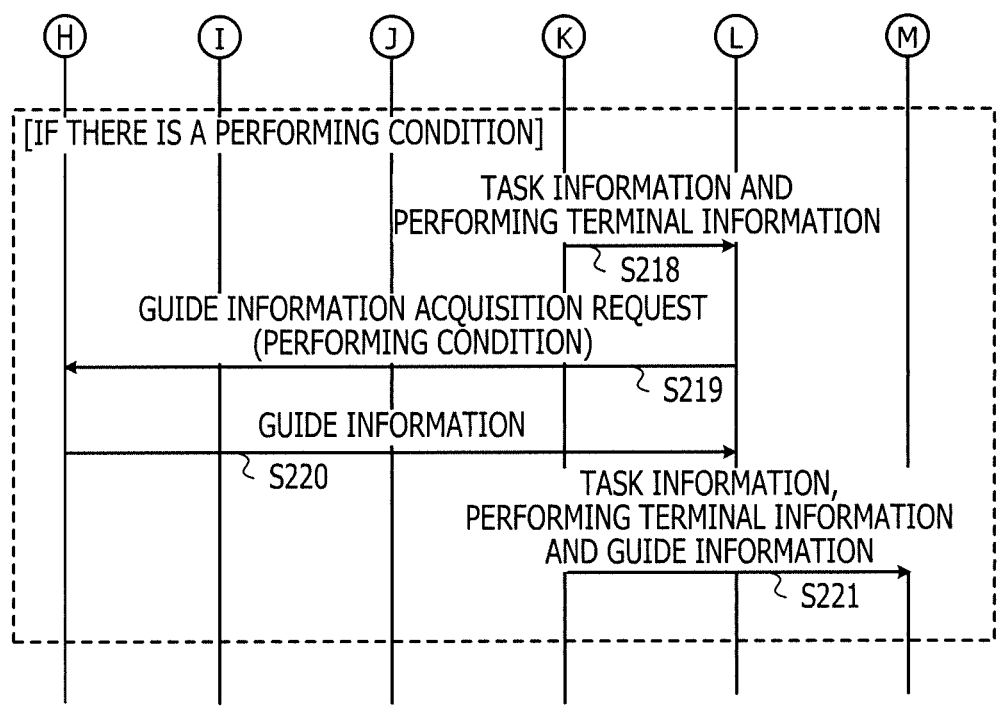

FIGS. 15A and 15B are sequence diagrams for explaining an example of a process procedure according to the second embodiment.

For example, in each terminal 20, the resource evaluator 22 evaluates whether a certain resource is usable by the terminal 20 (S201). Step S201 may be performed on a regular basis, or each time a resource usable by the terminal 20 changes. In this respect, "each time a resource usable by the terminal 20 changes" represents "each time an application is installed into or uninstalled from the terminal 20," "each time an external apparatus is connected to or disconnected from the terminal 20," or the like. In a case where an application is installed into the terminal 20, the evaluation result may be that a resource to be processed by the application becomes usable by the terminal 20. In a case where an application is uninstalled from the terminal 20, the evaluation result may be that a resource to be processed by the application becomes unusable by the terminal 20. In a case where an external apparatus is connected to the terminal 20, the evaluation result may be that the terminal 20 become able to use the external apparatus. In a case where an external apparatus is disconnected from the terminal 20, the evaluation result may be that the terminal 20 become unable to use the external apparatus.

Furthermore, step S201 may be performed each time a new piece of task information is registered into the task information storage 111 in the task management apparatus 10. In this case, each time a new piece of task information is registered into the task information storage 111, the task management apparatus 10 transmits the piece of task information to all the terminals 20. In this respect, "all the terminals 20" do not have to be limited to the terminals 20 of the person expected to perform the task related to the piece of task information. In each terminal 20 which receives the piece of task information, the resource evaluator 22, in step S201, may evaluate whether the terminal 20 may use a resource specified by a performing resource name included in the piece of task information.

Thereafter, the resource evaluator 22 notifies an evaluation result (determination result) of whether the resource is usable, to the evaluation result transmitter 23 (S202). The evaluation result transmitter 23 transmits the evaluation result to the task management apparatus 10 (S203).

Upon receipt of the evaluation result, the evaluation result receiver 12 in the task management apparatus 10 reflects the evaluation result on the evaluation result storage 113 (S204).

FIG. 16 is a diagram illustrating a configuration example of the evaluation result storage. As illustrated in FIG. 16, for each terminal ID (each terminal 20), the evaluation result storage 113 stores whether each resource is usable by the terminal 20. FIG. 16 illustrates an example in which the evaluation result storage 113 stores whether each resource type such "HTML File" and ".doc file," but not each specific resource, is usable. This corresponds to the example in which step S201 is performed each time an application is installed or uninstalled, or in a similar case. In a case where step S201 is performed for performing resources to be used for a task specified by a piece of task information each time the piece of task information is registered, a column for each specific resource may be created in the evaluation result storage 113. In a case where, for example, a piece of task information illustrated in FIG. 9 is registered, if one of the resources, "Document to be Checked (file://sv/path/document.pptx)" and "Display Unit (1920×1200 or larger)," does not have a corresponding column, a column for the resource having no corresponding column may be added to the evaluation result storage 113 in step S204.

Note that a column "Activation Status" in FIG. 16 indicates whether each terminal 20 is currently activated. To put it specifically, "○" represents that the corresponding terminal 20 is currently activated, while "×" represents that the corresponding terminal 20 is currently not activated. The value representing the activation status may be updated, for example, based on an evaluation result as long as the evaluation result is notified on a regular basis (that is to say, as long as step S203 is performed on a regular basis). To put it specifically, the activation status of a terminal 20 may be updated using "○" at each certain time interval as long as within the interval when the evaluation result receiver 12 receives a result of evaluating that the terminal 20 is currently activated. Otherwise, the activation status of the terminal 20 may be updated using "×" when the evaluation result receiver 12 receives a result of evaluating that the terminal 20 is currently not activated.

Otherwise, separately from the evaluation result, each terminal 20 may notify its activation to the task management apparatus 10 when it starts working, and may notify its stop to the task management apparatus 10 when it stops working. Upon reception of a notice of the activation, the evaluation result receiver 12 updates the activation status of the terminal 20 which is the transmission source of the notice, to "○". Upon reception of a notice of the stop, the evaluation result receiver 12 updates the activation status of the terminal 20 which is the transmission source of the notice, to "×".

Thereafter, when the performing time of a task comes, the task information transmitter 11 selects a piece of task information (hereinafter referred to as "object task information") related to the task from the pieces of task information stored in the task information storage 111, and notifies the object task information and a terminal ID of a terminal 20 which is the transmission destination of the object task information to the performing terminal information generator 13 (S211). The terminal ID of the terminal 20 which is the transmission destination of the object task information is identifiable by referring to the terminal information storage 112 in the same way as in the first embodiment.

Upon receipt of the notice including the object task information, the performing terminal information generator 13 refers to the evaluation results stored in the evaluation result storage 113 (S212), and selects a performing terminal for the task specified by the object task information from the terminals 20 which are the transmission destinations of the object task information (S213). For example, a terminal 20 which may use a larger number of performing resources than any other terminals 20 is selected as the performing terminal. Subsequently, based on the result of the performing terminal selection, the performing terminal information generator 13 generates performing terminal information (S214). Incidentally, in a case where the activation status of the performing terminal is "×," that is to say, in a case where a terminal 20 which is currently not activated is selected as the performing terminal, the performing terminal information generator 13 may include information about the activation of the performing terminal in the performing condition.

Thereafter, the performing terminal information generator 13 notifies, to the performing terminal information transmitter 14, the generated performing terminal information, the object task information notified in step S211, and the terminal IDs of the respective terminals 20 which are the transmission destinations of the object task information (S215). The performing terminal information transmitter 14 transmits the performing terminal information and the object task information to all the terminals 20 (S216).

Steps S217 to S221 may be the same as steps S112 to S116 in FIGS. 4A and 4B. In steps S217 and S221, however, the object task information is notified to the task information presenter 26 as well.

Note that in a case where a guide information acquisition request in S219 includes the performing condition indicating the activation of the performing terminal, the guide information manager 15 may generate guide information for prompting the user to activate the performing terminal. In this case, the terminals other than the performing terminal output a message such as "Activate PC a, and Fill out Application".

As discussed above, the second embodiment may obtain the same effects as the first embodiment.

Furthermore, in the second embodiment, each terminal 20 evaluates whether each resource is usable by the terminal 20, asynchronously with the task performing time. Thus, a terminal 20 which is not activated at the task performing time may be selected as the performing terminal. This makes it possible to make a performing person use a terminal 20 suitable to perform the task by prompting the performing person to activate the terminal 20 which, although currently not activated, may use a larger number of performing resources than any other terminals 20.

Next, descriptions will be provided for a third embodiment. The third embodiment will describe what makes the third embodiment different from the second embodiment. What will not be particularly described with regard to the third embodiment may be the same as those in the second embodiment.

Figure 17:
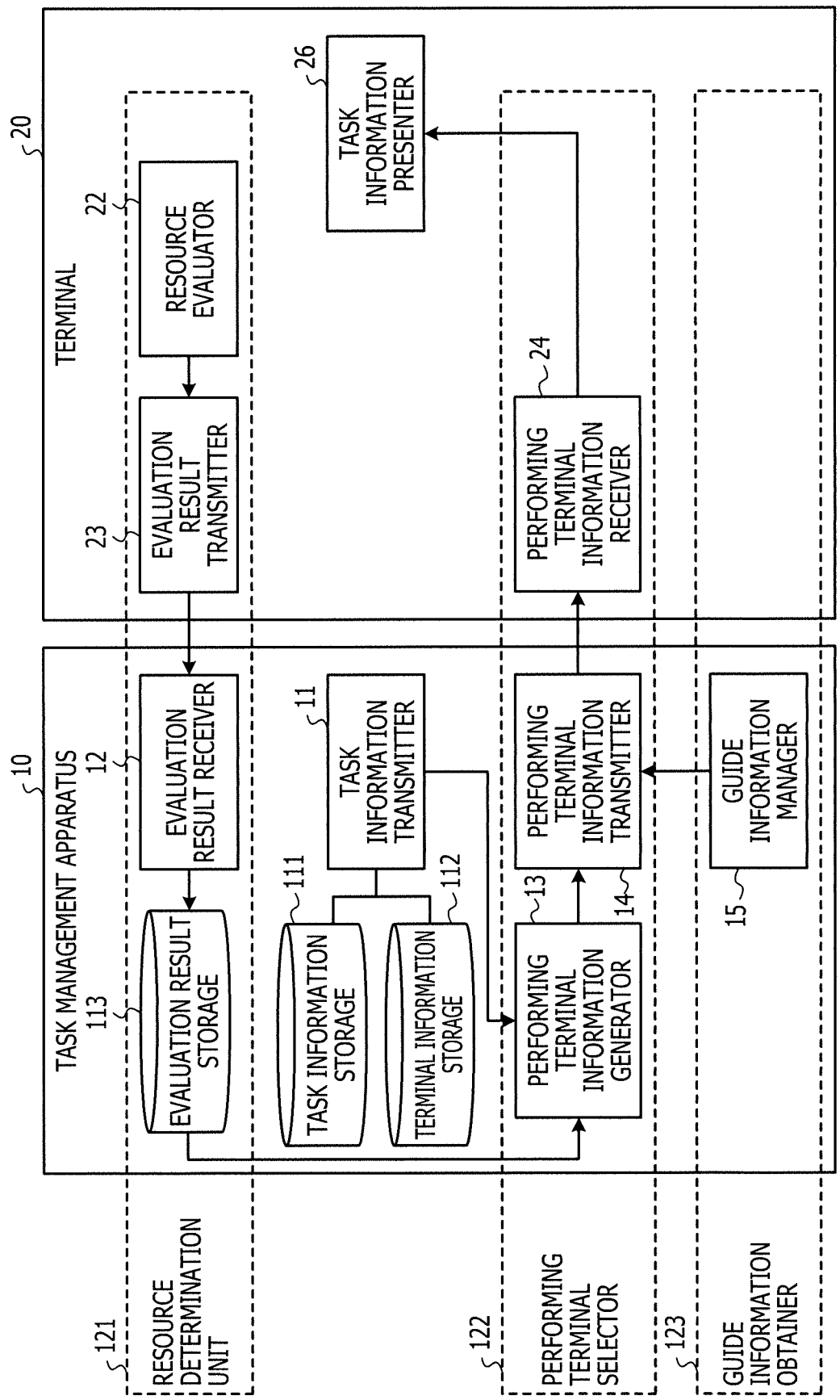
FIG. 17 is a diagram illustrating a functional configuration example of a task management system according to a third embodiment.

FIG. 17 is a diagram illustrating a functional configuration example of a task management system according to a third embodiment. Components in FIG. 17 which are the same as, or correspond to, those in FIG. 14 will be denoted by the same reference signs, and descriptions for such components will be omitted whenever deemed appropriate.

In the third terminal, guide information is also transmitted to each terminal 20 at the timing when the task information and the performing terminal information are transmitted to the terminal 20, in a case where the performing terminal information includes a performing condition. Each terminal 20, therefore, does not have to include the guide information inquirer 25.

Figure 18A:
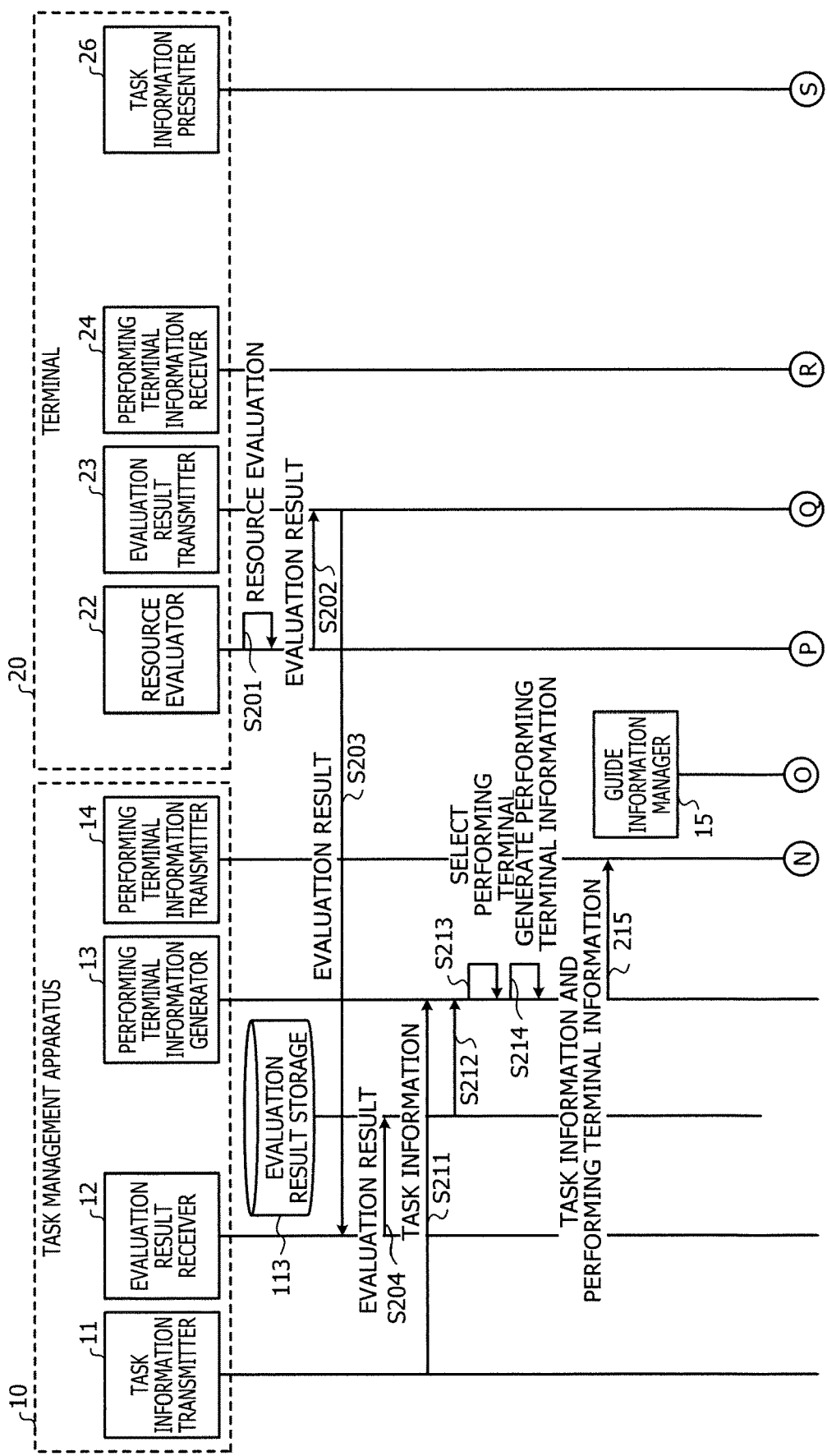

FIGS. 18A and 18B are sequence diagrams for explaining an example of a process procedure according to the third embodiment. Steps in FIGS. 18A and 18B which are the same as those in FIGS. 15A and 15B will be denoted by the same step numbers, and descriptions for such steps will be omitted. Parts of the procedure in FIGS. 18A and 18B which follow step S215 are different from those of the procedure in FIGS. 15A and 15B.

Following step S215, the performing terminal information transmitter 14 requests the guide information manager 15 to obtain guide information in a case where the performing terminal information notified from the performing terminal information generator 13 includes a performing condition (S301). This request includes the performing condition. The guide information manager 15 obtains the guide information in the same way as in each of the foregoing embodiments, and sends back the obtained guide information to the performing terminal information transmitter 14 (S302). Incidentally, in a case where the performing terminal information includes no performing condition, step S301 or step S302 does not have to be performed.

Subsequently, the performing terminal information transmitter 14 transmits the performing terminal information and the object task information to all the terminals 20 which are the transmission destinations of the object task information (S303). Step S303 corresponds to step S216 in FIGS. 15A and 15B. In step S303, however, the guide information is transmitted together in the case where the guide information is obtained.

In each terminal 20, upon receipt of the task information and the performing terminal information, the performing terminal information receiver 24 notifies the task information and the performing terminal information to the task information presenter 26 (S304). Furthermore, in a case where the guide information is received, the guide information is also notified to the task information presenter 26.

The following parts of the procedure may be the same as those of the procedure of the second embodiment.

As discussed above, the guide information may be obtained by the task management apparatus 10, and transmitted, together with the task information and the performing terminal information, to each terminal 20.

Note that in each of the foregoing embodiments, the task management system 1 is an example of the information processing system. The task management apparatus 10 is an example of the information processing apparatus. The resource determination unit 121 is an example of the determination unit. The performing terminal selector 122 is an example of the selector. The performing terminal information transmitter 14 is an example of the first transmitter. The guide information obtainer 123 is an example of the obtainer. The task information transmitter 11 is an example of the second transmitter.

Although the embodiments disclosed herein have been discussed in detail, the disclosure is not limited to these specific embodiments. The embodiments may be variously modified and changed within a scope of the gist described in the claims.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing system comprising:
a first information processing apparatus; and
a plurality of second information processing apparatuses which are connected to the first information processing apparatus via a network, wherein
the first information processing apparatus includes
a first processor configured to
execute a determination process that includes, for each of one or more resources to be used to perform a task, obtaining evaluation information about whether the resource is suitable to be used by each of the plurality of second information processing apparatuses,
execute a selection process that includes selecting one from the plurality of second information processing apparatuses based on the evaluation information, and
execute a first transmission process that includes transmitting a result of the selection by the selection process to the plurality of second information processing apparatuses, and
each of the plurality of second information processing apparatuses includes
a second processor configured to
execute an output process that includes, when the second information processing apparatus to which the second processor belongs is not selected by the result of the selection received from the first information processing apparatus, outputting information indicating any of the plurality of second information processing apparatuses which is selected by the result of the selection.

2. The information processing system according to claim 1,
wherein the output process includes, when the second information processing apparatus to which the second processor belongs is not selected by the result of the selection received from the first information processing apparatus, outputting guide information indicative of a guidance for a user such that among the one or more resources to be used to perform the task, a resource that is not usable by the selected second information processing apparatus becomes usable for the user.

3. The information processing system according to claim 2,
wherein the output process includes transmitting the guide information in response to a request from at least one of the plurality of second information processing apparatuses.

4. The information processing system according to claim 2,
wherein the first transmission process includes transmitting the guide information to the plurality of second information processing apparatuses in accordance with the evaluation information on whether the resource is usable by each of the plurality of second information processing apparatuses.

5. The information processing system according to claim 1,
wherein the selection process includes selecting any of the plurality of second information processing apparatuses which is able to use a larger number of resources to be used to perform the task than any other of the plurality of second information processing apparatuses.

6. The information processing system according to claim 1, wherein
the first processor is further configured to execute a second transmission process that includes transmitting an instruction to perform the task to the plurality of second information processing apparatuses, and
the determination process includes, for each of the one or more resources specified by the instruction to perform the task, obtaining the evaluation information about whether the resource is usable by each of the plurality of second information processing apparatuses, after the plurality of second information processing apparatuses receive the instruction to perform the task.

7. The information processing system according to claim 1, wherein the determination process includes, for each of resources with potential to be used for the task, obtaining the evaluation information about whether the each of resources is usable by each of the plurality of second information processing apparatuses, before any instruction to perform the task is transmitted to the plurality of second information processing apparatuses, and
the first transmission process includes transmitting an instruction to perform the task, together with the selection result, to the plurality of second information processing apparatuses.

8. A method performed by an information processing system which includes a first information processing apparatus and a plurality of second information processing apparatuses which are connected to the first information processing apparatus via a network, the method comprising:
executing, by a first processor of the first information processing apparatus, a determination process that includes, for each of one or more resources to be used to perform a task, obtaining evaluation information about whether the resource is suitable to be used by each of the plurality of second information processing apparatuses,
executing, by the first processor of the first information processing apparatus, a selection process that includes selecting one from the plurality of second information processing apparatuses based on the evaluation information,
executing, by the first processor of the first information processing apparatus, a first transmission process that includes transmitting a result of the selection by the selection process to the plurality of second information processing apparatuses, and
executing, by a second processor of each of the plurality of second information processing apparatus, an output process that includes, when the second information processing apparatus to which the second processor belongs is not selected by the result of the selection received from the first information processing apparatus, outputting information indicating any of the plurality of second information processing apparatuses which is selected by the result of the selection.

9. The information processing method according to claim 8,
wherein the output process includes, when the second information processing apparatus to which the second processor belongs is not selected by the result of the selection received from the first information processing apparatus, outputting guide information indicative of a guidance for a user such that among the one or more resources to be used to perform the task, a resource that is not usable by the selected second information processing apparatus becomes usable for the user.

10. The information processing method according to claim 9,
wherein the output process includes transmitting the guide information in response to a request from at least one of the plurality of second information processing apparatuses.

11. The information processing method according to claim 9,
wherein the first transmission process includes transmitting the guide information to the plurality of second information processing apparatuses in accordance with the evaluation information on whether the resource is usable by each of the plurality of second information processing apparatuses.

12. The information processing method according to claim 8,
wherein the selection process includes selecting any of the plurality of second information processing apparatuses which is able to use a larger number of resources to be used to perform the task than any other of the plurality of second information processing apparatuses.

13. The information processing method according to claim 9, the method further comprising:
executing, by the first processor of the first information processing apparatus, a second transmission process that includes transmitting an instruction to perform the task to the plurality of second information processing apparatuses, wherein
the determination process includes, for each of the one or more resources specified by the instruction to perform the task, obtaining the evaluation information about whether the resource is usable by each of the plurality of second information processing apparatuses, after the plurality of second information processing apparatuses receive the instruction to perform the task.

14. The information processing method according to claim 8, wherein the determination process includes, for each of resources with potential to be used for the task, obtaining the evaluation information about whether the each of resources is usable by each of the plurality of second information processing apparatuses, before any instruction to perform the task is transmitted to the plurality of second information processing apparatuses, and
the first transmission process includes transmitting an instruction to perform the task, together with the selection result, to the plurality of second information processing apparatuses.

15. A non-transitory computer-readable storage medium for storing at least either a first program and a second program, the first program causing a first processor of a first information processing apparatus to execute a first process, the second program causing a second processor of each of a plurality of second information processing apparatuses to a second process,
the first process comprising:
executing a determination process that includes, for each of one or more resources to be used to perform a task, obtaining evaluation information about whether the resource is suitable to be used by each of the plurality of second information processing apparatuses;
executing a selection process that includes selecting one from the plurality of second information processing apparatuses based on the evaluation information; and
executing a first transmission process that includes transmitting a result of the selection by the selection process to the plurality of second information processing apparatuses,
the second process comprising:
executing an output process that includes, when the second information processing apparatus to which the second processor belongs is not selected by the result of the selection received from the first information processing apparatus, outputting information indicating any of the plurality of second information processing apparatuses which is selected by the result of the selection.

* * * * *